United States Patent
Enomoto (10) Patent No.: US 7,825,991 B2
(45) Date of Patent: Nov. 2, 2010

(54) MULTI-VIDEO DISPLAY SYSTEM

(75) Inventor: Takahiro Enomoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 1187 days.

(21) Appl. No.: 11/431,624

(22) Filed: May 11, 2006

(65) Prior Publication Data

US 2006/0257109 A1    Nov. 16, 2006

(30) Foreign Application Priority Data

| May 12, 2005 | (JP) | ............... | 2005-139974 |
| Jun. 6, 2005 | (JP) | ............... | 2005-166189 |
| Mar. 3, 2006 | (JP) | ............... | 2006-058293 |

(51) Int. Cl.
*H04N 5/45* (2006.01)
*H04N 9/74* (2006.01)
*H04N 5/64* (2006.01)
*H04N 7/18* (2006.01)

(52) U.S. Cl. .............. 348/588; 348/564; 348/837; 725/75

(58) Field of Classification Search ........... 348/739, 348/588, 565, 832, 840, 51, 52, 54–60, 738, 348/564, 468; 725/75–77; 359/472, 479
See application file for complete search history.

(56) References Cited

U.S. PATENT DOCUMENTS

| 4,879,603 A * | 11/1989 | Berman .............. 348/832 |
| 5,225,819 A | 7/1993 | Hosotani et al. |
| 5,237,418 A * | 8/1993 | Kaneko .............. 348/565 |
| 5,512,954 A * | 4/1996 | Shintani .............. 348/468 |
| 5,602,598 A * | 2/1997 | Shintani .............. 348/565 |
| 6,021,308 A * | 2/2000 | Kimura .............. 725/75 |
| 6,377,230 B1 * | 4/2002 | Yamazaki et al. ........ 345/7 |
| 7,123,131 B2 * | 10/2006 | Arai .............. 340/425.5 |
| 2003/0093798 A1 * | 5/2003 | Rogerson .............. 725/75 |
| 2003/0135858 A1 * | 7/2003 | Nemoto .............. 725/75 |
| 2004/0042763 A1 * | 3/2004 | Morita et al. .............. 386/46 |
| 2004/0083491 A1 * | 4/2004 | Chang .............. 725/75 |

(Continued)

FOREIGN PATENT DOCUMENTS

JP    A-H08-98111    4/1996

(Continued)

OTHER PUBLICATIONS

"Display 2005 Report vol. 3", http://ascii24.com/news/i/topi/article/2005/04/20/655512-000.html. (Discussed in pp. 1-3 of the spec.).

*Primary Examiner*—Victor Kostak
(74) *Attorney, Agent, or Firm*—Posz Law Group, PLC (57) ABSTRACT

A multi-video display system includes a multi-video display unit, a caption mode designating unit, a caption adding unit, a sound mode designating unit, and a sound adding unit. The multi-video display is capable of displaying videos, which are respectively viewable from mutually different positions. The caption mode designating unit designates one of caption modes for each of the displayed videos. The caption adding unit adds one of captions based on the designated one of the caption modes to the each of the displayed videos. The sound mode designating unit designates one of sound modes for the each of the displayed videos. The sound adding unit adds one of sounds based on the designated one of the sound modes to the each of the displayed videos.

15 Claims, 7 Drawing Sheets

U.S. PATENT DOCUMENTS

| | | | |
|---|---|---|---|
| 2004/0237111 A1* | 11/2004 | Iraclianos et al. | 725/75 |
| 2004/0252187 A1* | 12/2004 | Alden | 348/51 |

FOREIGN PATENT DOCUMENTS

| | | |
|---|---|---|
| JP | A-H11-219105 | 8/1999 |
| JP | A-2002-314896 | 10/2002 |
| JP | A-2003-121160 | 4/2003 |
| JP | A-2003-296595 | 10/2003 |

* cited by examiner

|  | SCREEN VIEW | STATUS | MODE | |
|---|---|---|---|---|
|  |  |  | CAPTION | SOUND |
| DEFAULT | RIGHT | — | NONE | JAPANESE |
|  | LEFT | — | NONE | JAPANESE |
| USER DESIGNATION | RIGHT | INVALID | — | — |
|  | LEFT | VALID | JAPANESE | ENGLISH |

FIG. 13

|  | SCREEN VIEW | STATUS | MODE | |
|---|---|---|---|---|
|  |  |  | CHARACTER | SOUND |
| DEFAULT | RIGHT | — | NONE | JAPANESE |
|  | LEFT | — | NONE | JAPANESE |
| USER DESIGNATION | RIGHT | VALID | JAPANESE | JAPANESE |
|  | LEFT | INVALID | — | — |

FIG. 12

MULTI-VIDEO DISPLAY SYSTEM

CROSS REFERENCE TO RELATED APPLICATIONS

This application is based on and incorporates herein by reference Japanese Patent Applications No. 2005-139974 filed on May 12, 2005, No. 2005-166189 filed on Jun. 6, 2005, and No. 2006-58293 filed on Mar. 3, 2006.

FIELD OF THE INVENTION

The present invention relates to a multi-video (or multi-views) display system that capable of displaying mutually different multiple videos, each video of which is visible from a specific viewing position.

BACKGROUND OF THE INVENTION

There is known a display unit for video of DVD (Digital Versatile Disk) to allow a user to easily enjoy video content not only at home but also in a vehicle. This video display unit, or video player is able to designate a mode for a caption or sound (speech language).

Non-Patent Document 1 describes a double-video display unit (called stereo display unit) as becoming popular; it can display different videos which can be respectively seen from different viewing positions (e.g., from a right-hand position or left-hand position). Furthermore, this double-video display unit allows sight lines from a driver seat and an assistant-driver seat to view mutually different videos, respectively, by adjusting viewable directions of the display unit.

Patent Document 1 describes a navigation device as allowing its display unit to be adjustable or variable in visibility and operability from either side position, i.e., right-hand position or left-hand position. Furthermore, Patent Document 2 describes a multi-screen display unit, in which a character output method can be changed with respect to each screen.

The double-video display unit in Non-Patent Document 1 is unable to designate a mode for a caption or sound with respect to each video. For instance, suppose that this device plays a video on two screen views for a child and a parent, and that the child wants to watch and listen to the video in Japanese dubbed from original English while the parent wants to watch and listen to the video in original English. In this case, the parent may reluctantly listen to the video in Japanese corresponding to the dubbing mode designated based on the child's preference.

The navigation device in Patent Document 1 does not disclose that two screens or screen views are simultaneously available. The multi-video display unit in Patent Document 2 needs to designate every character or every pattern in each view, so that it is not so easy for a user to designate characters and patterns in both views.

Non-Patent Document 1: ASCII24 News/topic, Apr. 20, 2005 "Display 2005 Report Vol. 3—Double-video display unit "Two different full-screened videos viewable from a driver seat and an assistant-driver seat, respectively"
<URL:http://ascii24.com/news/i/topi/article/2005/04/20/655512000.html?geta>
Patent Document 1: JP-2003-121160 A
Patent Document 2: JP-H02-297587 A

SUMMARY OF THE INVENTION

It is an object of the present invention to provide a multi-video (or multi-view) display system including a multi-video display unit capable of displaying mutually different videos viewable from respective viewing positions. The multi-video display system is able to provide, to viewers, mutually different captions or sounds (or speech languages) depending on corresponding respective screen views.

To achieve the above object, a multi-video display system is provided as follows. A multi-video display unit is included to be capable of displaying videos, which are respectively viewable from mutually different positions. A caption mode designating unit is included to designate one of caption modes for each of the displayed videos. A caption adding unit is included to add one of captions based on the designated one of the caption modes to the each of the displayed videos.

For instance, under the above structure of the display system, one of two persons, who see mutually different videos, can designate a caption mode different from that of the other without need of prioritizing one of the two. That is, one can see the video with a Japanese caption while the other can see the video with an English caption or without any caption.

As another aspect of the present invention, a multi-video display system is provided as follows. A multi-video display unit is included to be capable of displaying videos, which are respectively viewable from mutually different positions. A sound mode designating unit is included to designate one of sound modes for each of the displayed videos. A sound adding unit is included to add one of sounds based on the designated one of the sound modes to the each of the displayed videos.

For instance, under the above structure of the display system, one can see the video in Japanese while the other can see the video in English.

As yet another aspect of the present invention, a multi-video display system is provided as follows. A multi-video display unit is included to be capable of displaying videos, which are respectively viewable from mutually different positions. A caption mode designating unit is included to designate one of caption modes for each of the displayed videos. A caption adding unit is included to add one of captions based on the designated one of the caption modes to the each of the displayed videos. A sound mode designating unit is included to designate one of sound modes for each of the displayed videos. A sound adding unit is included to add one of sounds based on the designated one of the sound modes to the each of the displayed videos.

For instance, under the above structure of the display system, one can see the video in Japanese without caption while the other can see the video in English with a Japanese caption.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
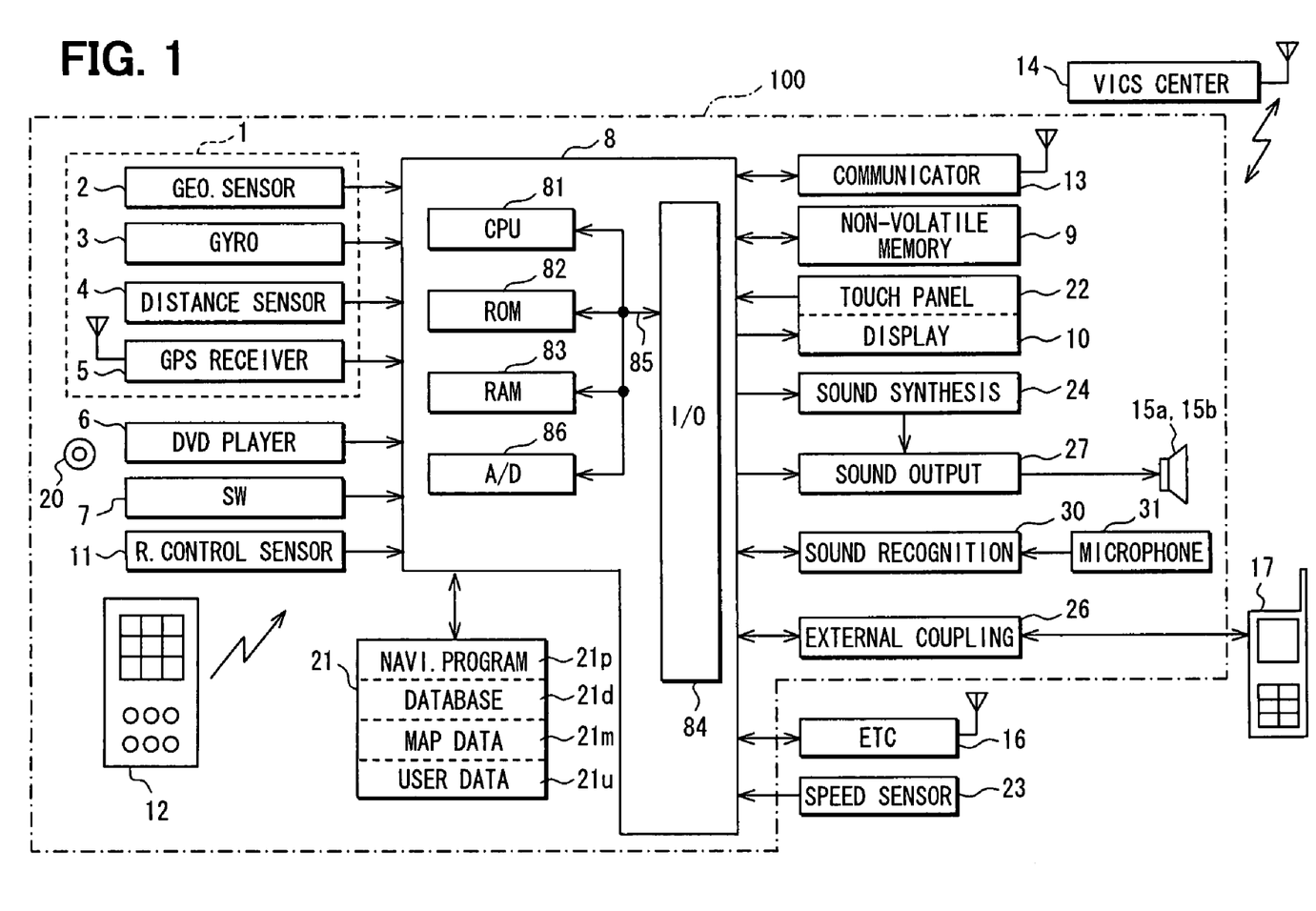
FIG. 1 is a diagram of an overall structure of a navigation system of an example embodiment of the present invention.

A multi-video display system according to an embodiment of the present invention is adapted to a navigation system provided in a vehicle. Not limited to a navigation system, the multi-video display system can be also adapted to other audio/visual devices such as a TV receiver. An example structure of the navigation system 100 is shown in FIG. 1.

The navigation system 100 includes a position detector 1, a DVD player 6, an operation switch group 7, a remote control sensor 11, a sound synthesis circuit 24 for sound guidance, speakers 15a, 15b, non-volatile memory 9, a display unit 10, a communicator 13, a HDD (Hard Disk Drive) 21, an external coupling device 26, a sound output circuit 27, a control circuit 8 connecting the foregoing devices or the like, and a remote controller 12.

The position detector 1 includes a known geomagnetic sensor 2, gyroscope 3, distance sensor 4, and GPS (Global Positioning System) receiver 5 for detecting a current position of the vehicle based on radio waves from satellites. These sensors or the like 2 to 5 have individual detection error types, so that detection results from the sensors 2 to 5 are supplemented with each other. Depending on required detection accuracy, only part of the sensors 2 to 5 may be used. Furthermore, a rotation sensor for a steering wheel, a vehicle speed sensor 23 for each traveling wheel can be also included in the position detector 1.

The operation switch group 7 includes a touch panel 22 integrated with the display unit 10, or mechanical switches. The touch panel 22 can be any one of the following types. A resistance film type is constructed as follows: a glass substrate and transparent film via a spacer 10 is overlaid with a screen of the display unit, and an electric circuit is arranged in X and Y axes on the screen. When a user touches a portion of the film, the circuit short-circuits at the touched portion, changing voltage in the circuit. The portion is detected as two-dimensional coordinates (X, Y). Another type of the touch panel 22 is constructed as follows: it includes an infrared sensor finely arranged lengthwise and breadthwise, a panel member that converts a finger's touch detected by the infrared sensor into an electrical signal, a signal processing circuit that transmits the electrical signal to an external device, and a controller to control the foregoing devices. For instance, when a finger or a touch pen interrupts infrared, a position where the infrared is interrupted is detected as two-dimensional coordinates (X, Y). Yet another type of the touch panel 22 such as an electrostatic capacity type is constructed as follows: a substance receiving an electrical signal is applied on a transparent conductive glass substrate. When a finger approaches the glass substrate, a sensor detects an electrical signal resulting from variation in electrostatic capacity.

Instead of the mechanical switches and touch panel, a pointing device such as a mouse or cursor can be used. Furthermore a microphone 31 and sound recognition unit 30 can be used for inputting various instructions. A speech is inputted via the microphone 31 to the unit 30, so that a sound signal is subjected to a known sound recognition technology to be converted to a corresponding operation command.

The sound recognition unit 30 includes an amplifier for amplifying a sound signal inputted via the microphone 31 to an adequate level, a DSP (Digital Signal Processor) for recognizing a sound by using a sound recognition algorism such as the known Hidden Markov Model after converting the amplified sound signal to a digital value, and memory for storing reference data to recognize a sound. The DSP converts a sound signal to digital data to send it to the control circuit 8.

Thus, the operation switch group 7, remote controller 12, touch panel 22, microphone 31 can be individually used as an input device for inputting various instructions or information.

For instance, the communicator 13 receives road traffic information from a VICS (Vehicle Information and Communication System) center 14.

The navigation system 100 can communicate with an ETC (Electronic Toll Collection) in-vehicle device 16, so that the system 100 can retrieve toll information that the ETC in-vehicle device 16 receives via an ETC roadside device (not shown). Furthermore, the system 100 can communicate with the VICS center 14 via the ETC in-vehicle device 16 and an external network.

The control circuit 8 is a usual computer or microcomputer to include a known CPU 81, ROM 82, RAM 83, input/output circuit (I/O) 84, A/D converter 86, and bus line 85 connecting the foregoing components. The CPU 81 controls the system 100 by using a navigation program 21p and data stored in the HDD 21. The CPU 81 also controls reading and writing to the HDD 21. The A/D converter 86 includes a known A/D (analog/digital) converting circuit, e.g., to convert analog data inputted from the position detector 1 to digital data accessible or readable to the CPU 81.

The HDD 21 further stores map data 21m including (i) map matching data for increasing accuracy in position detection and (ii) road data indicating connections of roads. The map data 21m includes (i) map image information for display, and (ii) road network information having link and node information. The link information defines a link constituting a road to include position coordinates, distance, necessary travel time, road width, the number of lanes, and speed regulation. The node information defines an intersection (diverging point) to include position coordinates, the number of right/left turn lanes, and connecting links; furthermore, inter-link connection information is included to indicate whether a traffic is possible or not between links.

The HDD 21 further stores user data 21u a user can input or update via the input device, and a database 21d for storing data needed to operate the system 100.

The above data stored in the HDD 21 can be alternatively stored in a storage medium; the data can be accessed or updated via the DVD player 6 functioning also as a map data input device. The storage medium can be typically a CD-ROM or DVD because of its data volume; however, another such as a memory card can be also used. Furthermore, data can be downloaded via an external network.

The non-volatile memory 9 can be an EEPROM (Electrically Erasable and Programmable Read Only Memory) or flash memory to store data needed to operate the system 100; the non-volatile memory 9 can hold data even while the navigation system turns off (or an accessory switch of the vehicle turns off). Data needed to operate the system 100 can be divided in parts and stored both in the HDD 21 and non-volatile memory 9. An access speed is faster in the non-volatile memory 9 than in the HDD 21, so that data more frequently read can be stored in the non-volatile memory 9 while data less frequently read can be stored in the HDD 21. Data stored in the non-volatile memory 9 can be backed up in the HDD 21.

Figure 2:
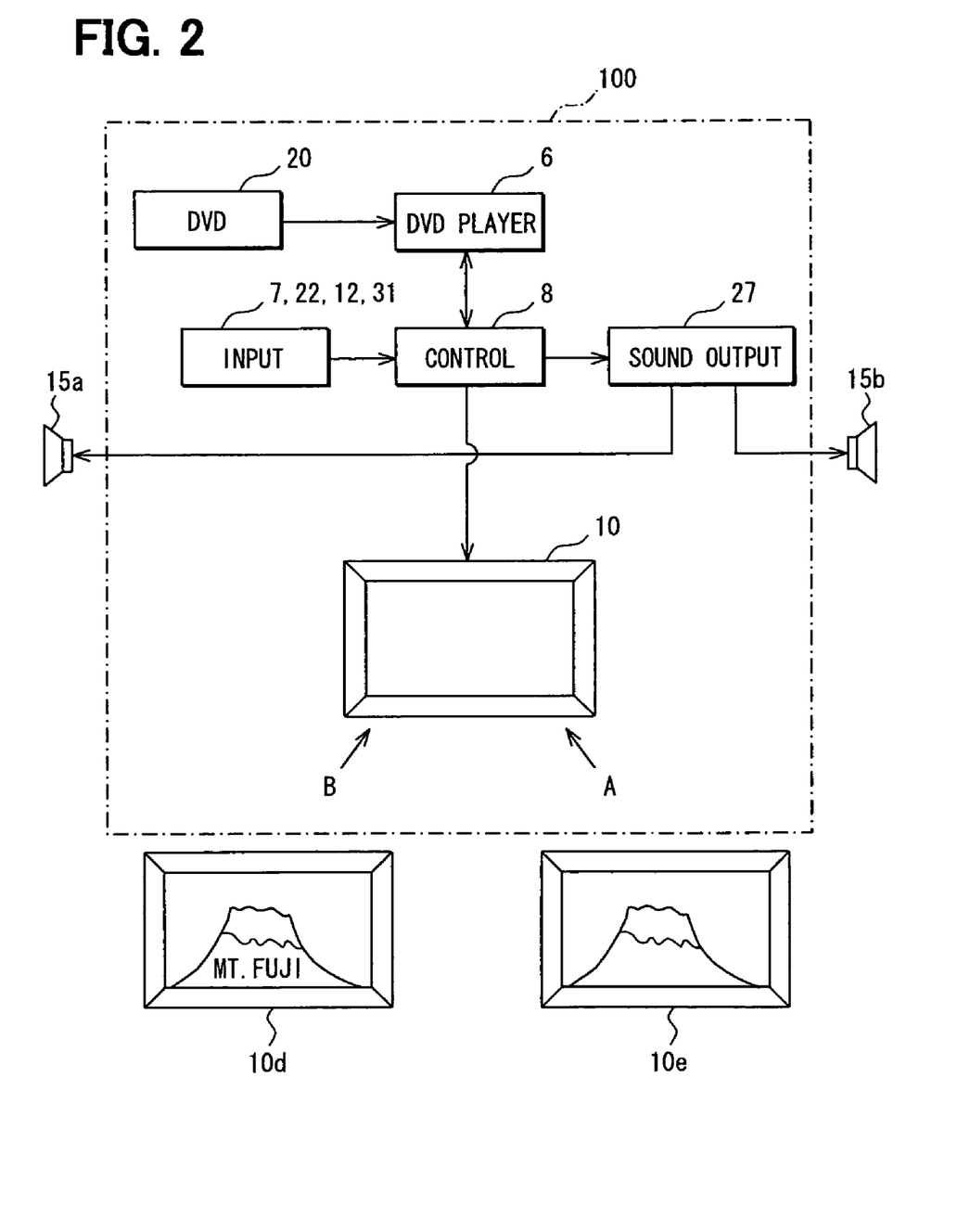
FIG. 2 is a block diagram of an overall structure of a multi-video display system.

For example, as shown in FIG. 2, the display unit 10 has two screen views on one screen depending on viewing positions (right-hand A, left-hand B). The two screen views display mutually different videos on the full screen. The display unit 10 uses a typical color liquid crystal display to include a driver circuit (not shown) to perform dot-matrix liquid crystal display and display control. The driver circuit adopts an active matrix driving method capable of securely putting on and off each pixel having a transistor, so as to display based on display instruction and view data transmitted from the control circuit 8. The display unit 10 can alternatively use an electro luminescence display or plasma display. The mechanical switches can be arranged in an area to surround the periphery of the display unit 10.

Figure 8:
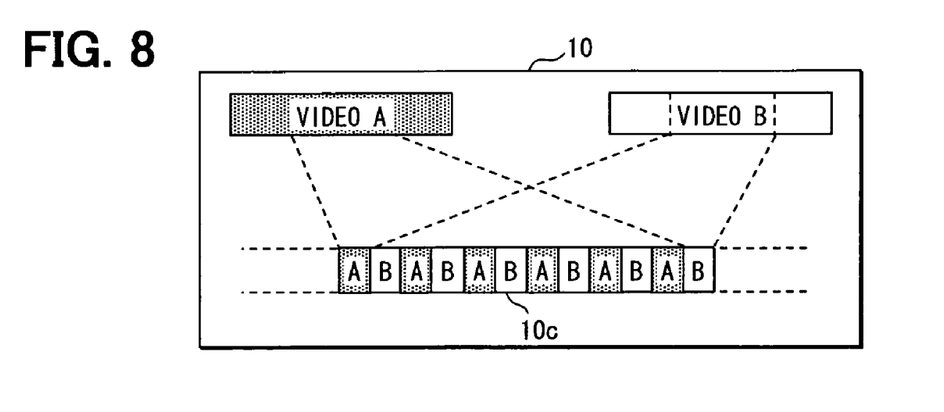
FIG. 8 is a diagram illustrating an example structure of a multi-video display unit.
Figure 9:
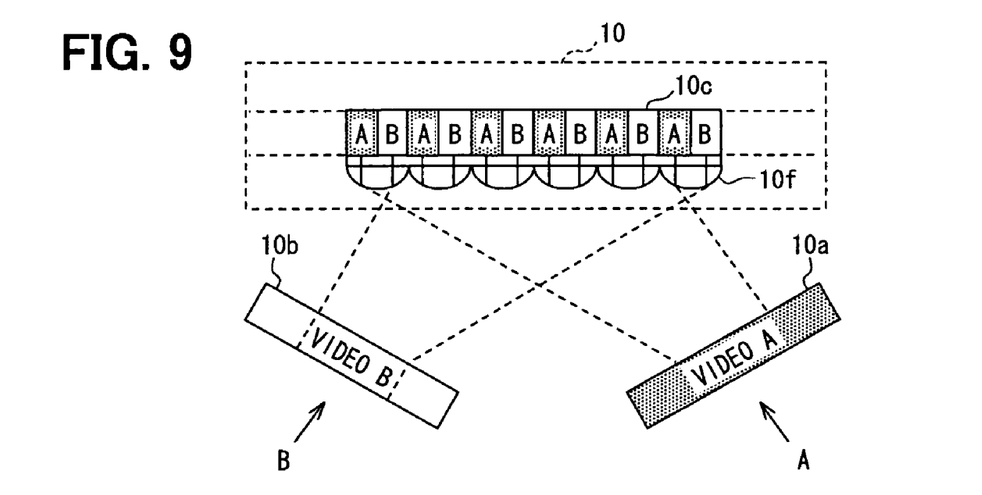
FIG. 9 is another diagram illustrating an example structure of a multi-video display unit.

Next, an example structure of the display unit 10 will be explained below with reference to FIGS. 8, 9, using an example of the known 3D display unit. FIGS. 8, 9 shows schematic views of the display unit 10 that is viewed from up above. The known 3D display unit uses a lenticular technology that shows a planar (2-dimensional) printed image, as being a stereoscopic (3-dimensional) or dynamic view, by using vision differences generated when each eye sees the same object at the same position.

At first, each of (i) a video A viewable from a viewing position A and (ii) a video B viewable from a viewing position B is vertically cut in rectangles. Then, rectangles cut from the video A and rectangles cut form the video B are alternately arranged to synthesize one video on a liquid crystal panel 10c.

This synthesized video is displayed through a lenticular lens sheet 10f having a lateral cross-section shaped of a series of arches in the front side, as shown in FIG. 9. Adjusting a curvature of the lens enables each of the videos A, B to be viewable as videos 10a, 10b from each of the positions A, B, respectively. As shown in the example in FIG. 2, the video B includes a caption "Mt. FUJI," while the video A includes no caption.

Another display method can be alternatively adopted; the method uses backlights and controls illuminating directions to simultaneously display two videos A, B. Here, each video A, B can be a moving image or still image. The videos A, B can be an identical video or different videos.

The sound synthesis circuit 24 transmits sound massages such as sound guidance. Based on an instruction of the navigation program 21p, the sound synthesis circuit 24 converts digital sound data stored in the non-volatile memory 9 or HDD 21 to analog signals and outputs to the speaker 15a, 15b via the sound output circuit 27.

To synthesize sounds, the following methods can be used. A recording/editing method accumulates encoded or direct sound waves and synthesizes them as needed. A parameter editing method analyzes sound waves to convert it to parameters, accumulates converted parameters, and synthesizes the parameters; then, the method drives the sound synthesis circuit 24 to produce sounds. A rule synthesizing method produces sounds from character strings or phoneme symbol strings based on a phonetic or linguistical rule.

The vehicle speed sensor 23 includes a rotation detector such as a known rotary encoder, e.g., provided around a position where a travel wheel is attached, for detecting rotation of the wheel to transmit corresponding pulse signals to the control circuit 8. The control circuit 8 converts the number of rotations of the wheel to a vehicle speed, and computes an estimated arrival time to a given position from a current position or an average speed every travel section.

The external coupling device 26 includes a coupler (or connector) and an input/output circuit for coupling to communicate data with an external device such as a sensor or controller. The device 26 can achieve one or more of the following functions: (i) coupling with a backup device for backing up data stored in the non-volatile memory 9 or HDD 21; (ii) interfacing with an in-vehicle local area network for communicating data with another in-vehicle device, (iii) coupling with an external network via a cellular phone 17, and (iv) coupling with another audio/visual device. The external coupling device 26 further includes a function such as retrieving data from the vehicle speed sensor 23, or coupling with the ETC in-vehicle device 16.

Under the above structure, the navigation system 100 performs a navigation process as follows. When the CPU 81 of the control circuit 8 activates the navigation program 21p to display a menu window on the display unit 10, a user selects from the menu window a navigation process (or route guidance process) via the input device to retrieve a route to a destination.

For instance, the user designates a destination. The destination is selected when the user selects a given position from a map, or using facility search or address search, or the destination is selected from memory position set by the user. Then a current position is obtained based on satellite data the GPS receiver 5 receives. An optimum route is computed from the current position to the destination. The computed route is overlapped on a map displayed on the display unit 10 to navigate the user (or the vehicle) along the route. To automatically retrieve an optimum route, the known Dijkstra method or the like is used. In addition, either or both of the speakers 15a, 15b output guidance for operations, or messages according to operating states.

The Dijkstra method computes a route estimation value (route computation cost) from the current position to each node, using link information, node information, and inter-link connection information. After completing computation of all the route estimation values to the destination, the method designates a route to the destination by connecting links to minimize all the total estimation cost. Each estimation value is set based on a road length, road kind, road width, the number of lanes, presence or absence of turning at intersections, or presence or absence of signals. For instance, the wider a road width is, the less the value is; the more the number of lanes is, the less the value is.

Computing a route computation cost for each link uses the following formula.

$$\text{Route computation cost} = \text{link length} \times \text{road width coefficient} \times \text{road kind coefficient} \times \text{congestion degree}$$

The road width coefficient varies depends on a road width. The road kind coefficient varies depending on a road kind such as a toll road. The congestion degree varies on a congestion degree in a road.

When the optimum route is designated, the control circuit 8 designates a guidance target such as an intersection where the vehicle needs to turn right or left, or building being a landmark. The control circuit 8 determines a guidance execution point in a given distance ahead of the guidance target; at the guidance execution point, the control circuit 8 is to perform corresponding guidance. For instance, several guidance execution points are set at 700 m, 300 m, and 100 m ahead of the guidance target with respect to an open road; and, 2 km, 1 km, and 500 m ahead of it with respect to an expressway.

The DVD player 6 plays, or reproduces a video or sound stored in a DVD 20 functioning as a storage medium. The DVD player 6 can be replaced with a known audio device, which includes an audio/video player, a tuner for watching the TV or listening to the radio, and a coupling circuit for coupling with the navigation system 100 via the external coupling device 26 of the system 100. The storage medium can be a CD (compact disk), MD (mini disk), memory card, or the like.

Next, using FIG. 2, playing of videos or sounds will be explained below. A user inserts a DVD 20 into the DVD player 6, and operates play of the DVD 20 (or content in the DVD 20) from a menu window displayed on the display unit 10, via the input device. As the control circuit 8 then transmits an instruction including modes for captions and sounds to the DVD player 6, the player 6 starts to play the DVD 20.

As video signals are sent to the display unit 10 via the I/O 84, the driver circuit of the display unit 10 displays videos on two screen views 10d, 10e. The first screen view 10e for a driver seat is viewable from a viewing position A; the second screen view 10d for an assistant-driver seat is viewable from a viewing position B. As sound signals are sent to the sound output circuit 27 including a known signal processing circuit and amplifying circuit via the I/O 84, sound corresponding to the video in the second screen view 10d is outputted via the speaker 15a and sound corresponding to the video in the first screen view 10e is outputted via the speaker 15b.

Figure 7:
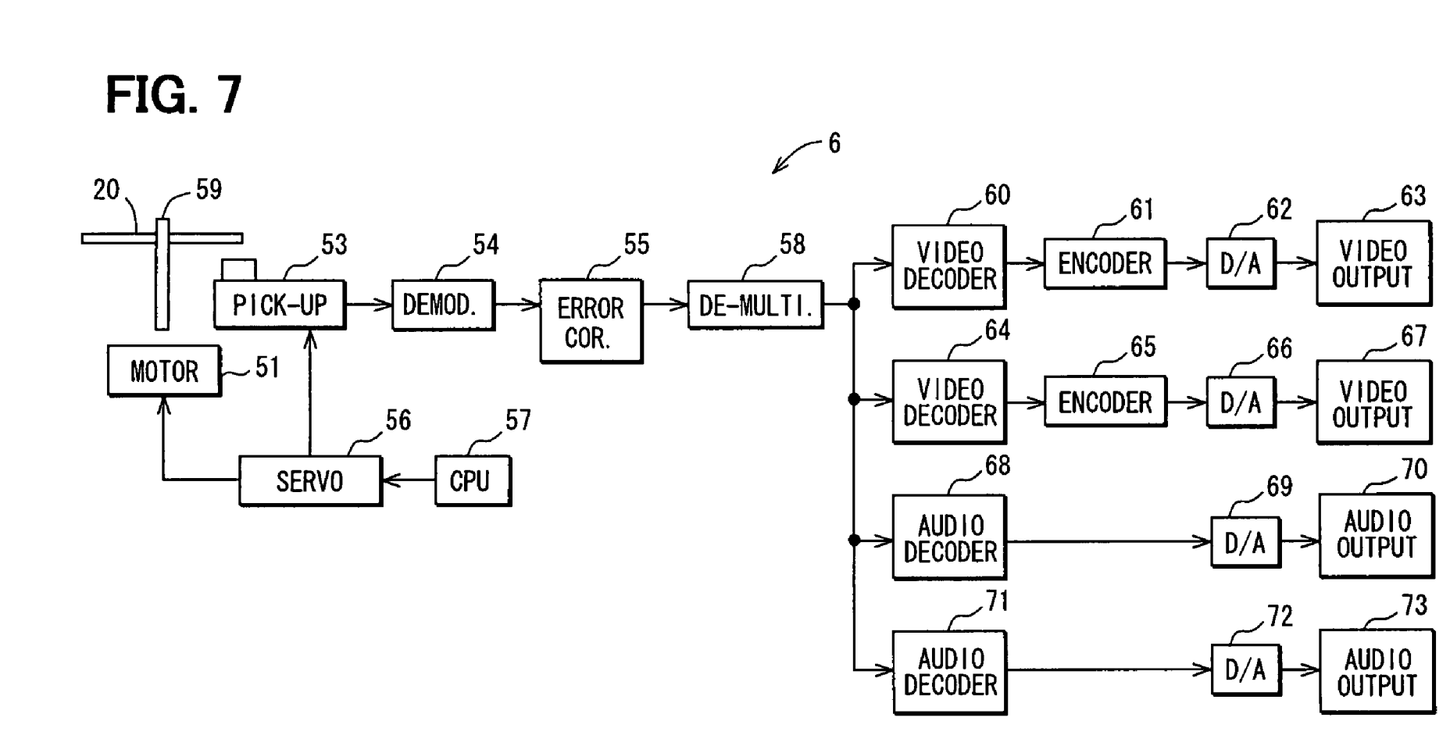
FIG. 7 is a block diagram of an overall structure of a DVD player.

FIG. 7 illustrates an outline of operations of the DVD player 6. The player 6 is known, so that part specific to the example embodiment will be mainly explained below. The player 6 is controlled by a CPU 57, or a program stored in a ROM or RAM connected to the CPU 57.

A pick-up 53 reads a signal on the DVD 20 (or disk) to convert it to an electrical signal as follows. The number of rotations of a spindle 59, or a motor 51 is increased to a given level, and a servo system 56 functions to obtain an electrical signal. For instance, in the servo system 56, a focus servo focuses on a surface of the DVD 20, a tracking servo then reads signals of "0" or "1" along a bit line, and a spindle servo adjusts to a position on the disk.

In the example embodiment, the control circuit 8 outputs an instruction including modes for captions and sounds, and data on a track corresponding to the modes for captions and sounds are read out.

A demodulator 54 demodulates the read data or signal, which is modulated for being stored on the DVD 20, to an original signal. An error corrector 55 corrects errors by using the known RS-PC (Read Solomon Product Code). A de-multiplexer 58 de-multiplexes a multiplex signal including a video, sound, and caption, by using identifiers.

In this example embodiment, a signal for video is divided into two video lines. A first video line includes a main video and a caption for the screen view from the driver seat, i.e., the position A, while a second video line includes the main video and a caption for the screen view from the assistant-driver seat, i.e., the position B. A signal for sound is also divided into two sound lines. A first sound line corresponds to the first video line, while a second video line corresponds to the second video line.

Each video decoder 60, 64 decodes a digital-coded signal, (e.g., encoded with the MPEG2 format) into a color difference signal. Each encoder 61, 65 encodes the color difference signal into a video signal such as an NTSC or PAL. Then each known digital/analog converter 62, 66 converts the video signal into an analog signal and sends it to the display unit 10 via a video output 63, 67. A video signal for the assistance-seat screen view is sent via the video output 63, while for the driver seat, via the video output 67.

An audio decoder 68, 71 decodes a digital signal (e.g., encoded with Dolby AC-3) into an original sound signal. Then each known digital/analog converter 69, 72 converts the sound signal into an analog signal and sends it to the display unit 10 via an audio output 70, 73. A sound signal for the assistance-seat screen view is sent via the audio output 70, while for the driver seat, via the audio output 73.

A process for designating modes for captions and sounds will be explained with reference to FIGS. 3 to 5, 10. This process is included in the navigation program 21p and is repeated along with other programs.

Figure 3:
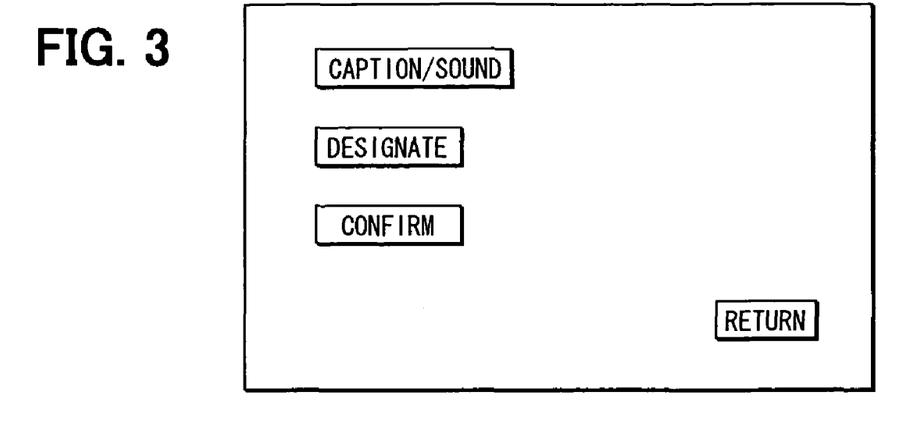
FIG. 3 is an example of a window for designating modes for captions or sounds.
Figure 10:
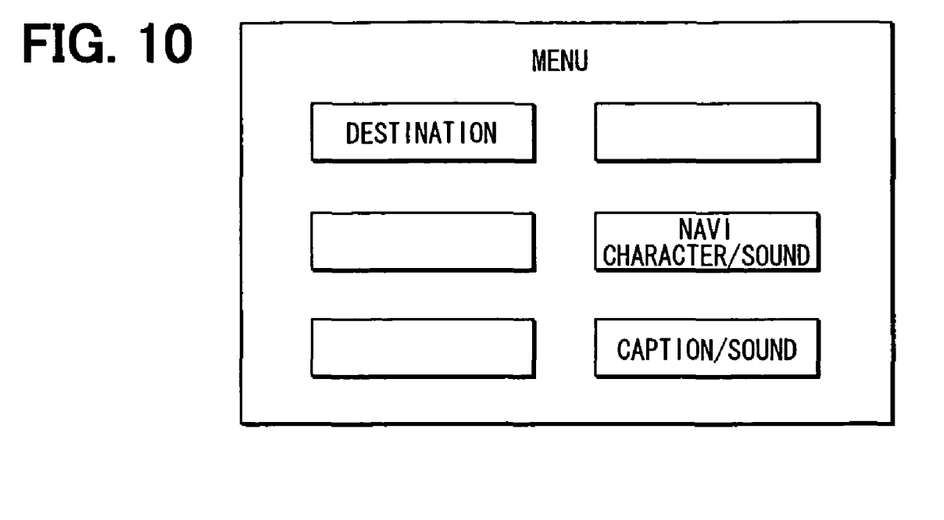
FIG. 10 is an example of a menu window.

When a user selects "CAPTION/SOUND" in a menu window shown in FIG. 10, via the input device, a window relating to "CAPTION/SOUND" is displayed as shown in FIG. 3. When the user selects "DESIGNATE" in FIG. 3, a window for selecting either "RIGHT SCREEN VIEW" (from the position A, driver seat) or "LEFT SCREEN VIEW" (from the position A, assistant-driver seat) shown in FIG. 4.

Figure 5:
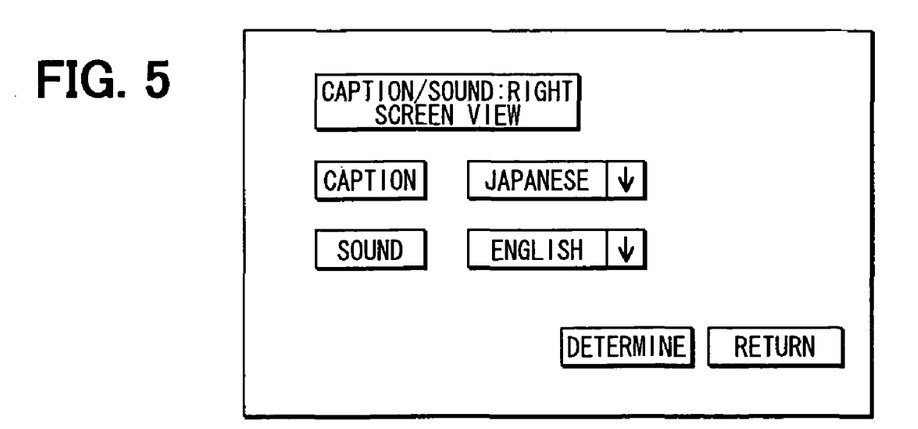
FIG. 5 is an example of a window appearing when a right screen view is selected in FIG. 4.

When "RIGHT SCREEN VIEW" is selected, a designation window for "RIGHT SCREEN VIEW" is displayed as shown in FIG. 5. For instance, after a button "↓" is pressed, a pull-down menu or sub-window is displayed. A user then selects modes for captions and sounds (or caption modes and sound modes). This designation window allows the user to select, with respect to a caption, a Japanese caption (currently selected), an English caption, another language caption, or no caption, and with respect to a sound, English (currently selected), Japanese, or another language. When a button "DETERMINE" is pressed, currently designated modes are stored in the database 21d or non-volatile memory 9.

Figure 11:
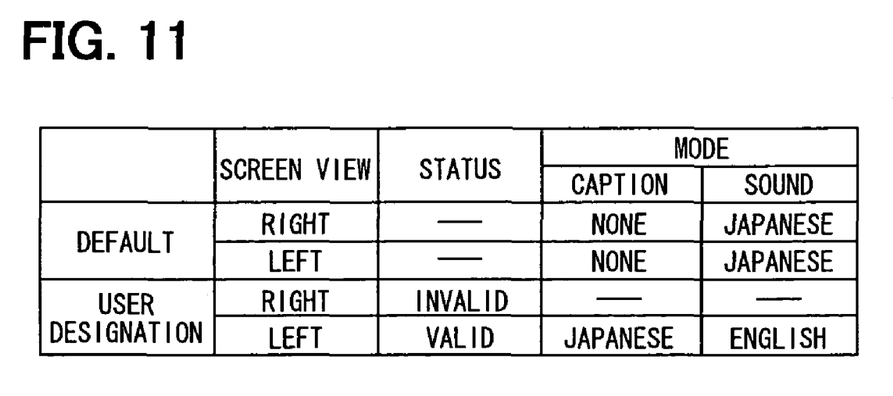
FIG. 11 is a table illustrating designated modes for captions and sounds.

FIG. 11 shows an example of designated modes for captions and sounds used in the DVD player 6. An initial mode is shown as "DEFAULT," e.g., indicating an official language of a country where the DVD player 6 is used. When a user designates modes as explained above, designated modes are stored in "USER DESIGNATION." In FIG. 11, "RIGHT SCREEN VIEW" of "USER DESIGNATION" has no designated modes, so that "STATUS" (or designation status) is indicated by "INVALID," while "LEFT SCREEN VIEW" has designated modes "JAPANESE" in "CAPTION" and "ENGLISH" in "SOUND," so that "STATUS" is indicated by "VALID."

Initial or designated modes are sent via the control circuit 8 to the DVD player 6, a corresponding caption or sound is added based on the sent modes when a video stored in the DVD 20 is played.

Information regarding captions and sounds that is stored in the DVD 20 is obtained by the control circuit 8 and displayed on the pull-down menu or sub-window.

Figure 4:
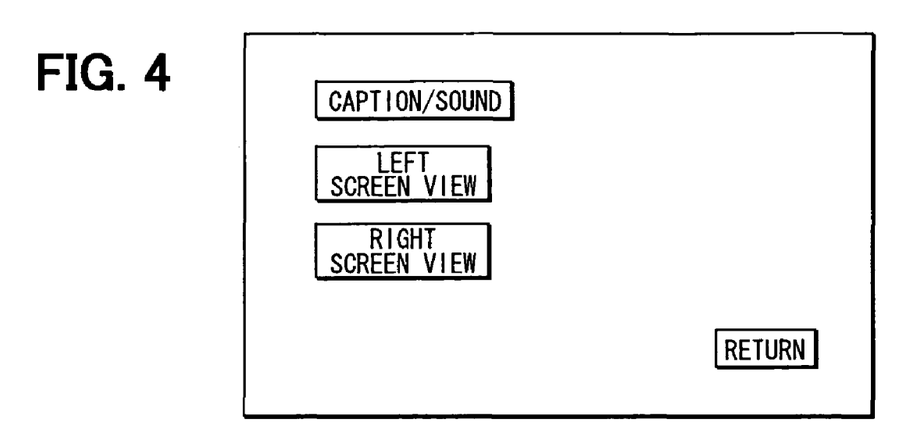
FIG. 4 is an example of a window appearing subsequently to FIG. 3.
Figure 6:
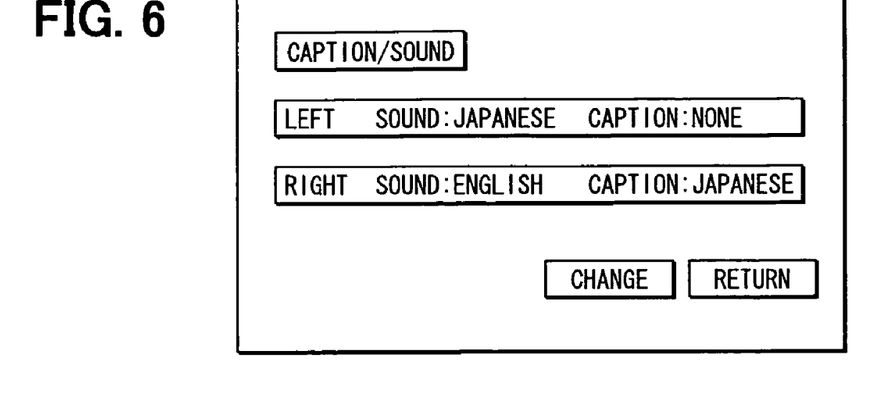
FIG. 6 is an example of a window for confirming modes for captions and sounds.

When a button "CONFIRM" in the window in FIG. 3 is pressed, the currently designated modes for captions and sounds are displayed in a window shown in FIG. 6, with respect to both the right screen view and left screen view. When a button "CHANGE" in the window in FIG. 3 is pressed, the window for designating modes for captions and sounds is displayed as shown in FIG. 4.

Figure 12:
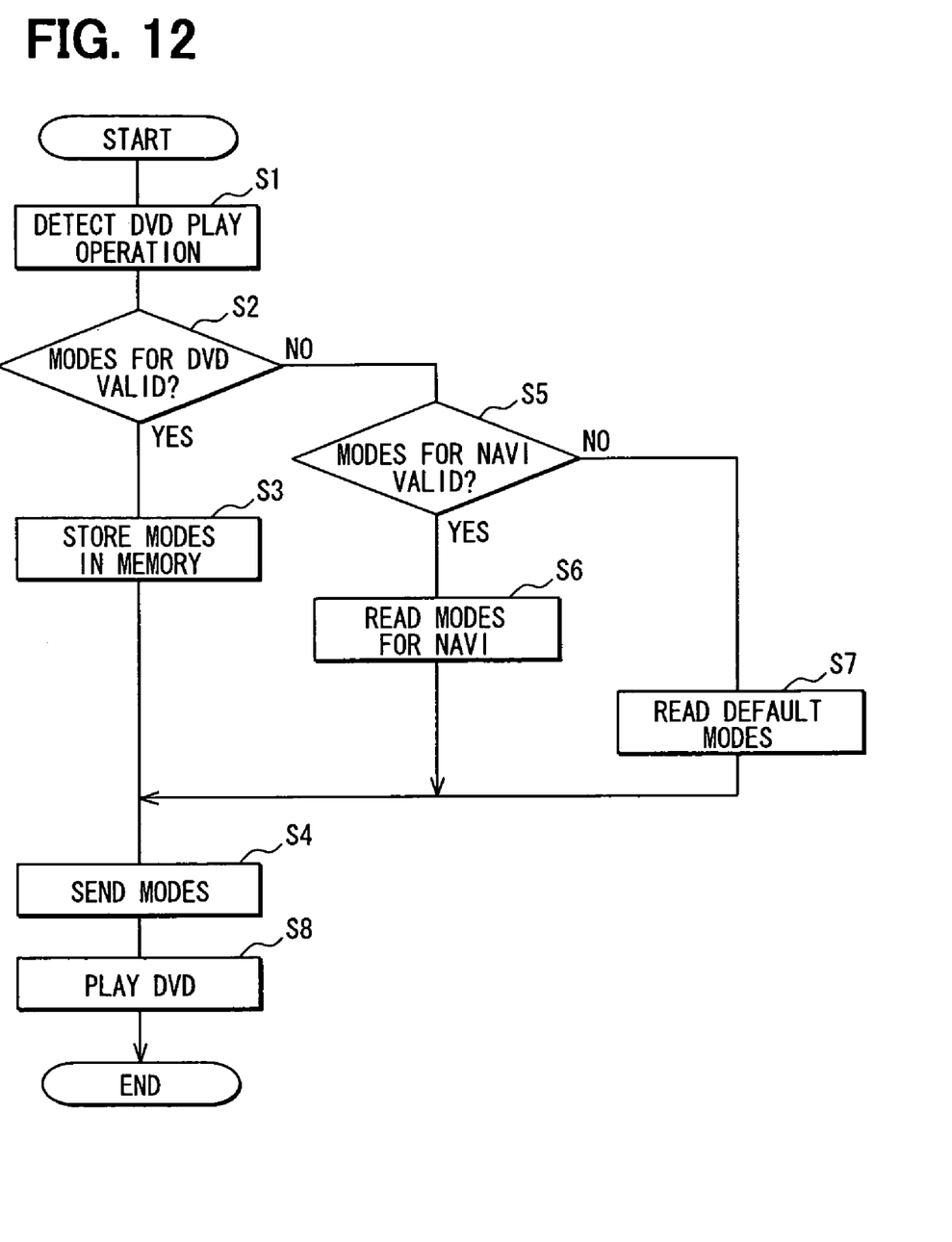
FIG. 12 is a flowchart of a process for designating modes for captions and sounds.

A process for designating modes for captions and sounds will be explained with reference to FIG. 12. This process is included in the navigation program 21p and repeated along with other programs.

When a DVD 20 is set in the DVD player 6, a user's instruction for playing the DVD 20 via the input device is detected (S1). When designation for captions and sounds for the DVD player 6 is already completed, e.g., when "USER DESIGNATION" is "VALID" (S2: YES), the control circuit 8 reads the designated modes and sends them to the DVD player 6. The DVD player 6 starts playing the DVD 20 according to the designated modes for captions and sounds (S4).

There may be a case that the modes for captions and sounds are designated when the user operates play of the DVD 20 (S2: YES). In this case, the designated mode is stored in the database 21*d* in the HDD 21 or non-volatile memory 9 (S3). The stored designated mode is then read by the control circuit 8 and sent to the DVD player 6. The DVD 20 is then played based on the designated modes for captions and sounds (S4).

Storing the designated modes can eliminate an additional procedure of the user for designating the modes each time the DVD 20 is played, thereby decreasing user's troublesomeness. In particular, the user who is driving the vehicle can focus on the driving since the driver need not operate to designate the modes each time the DVD 20 is played.

In contrast, when the designation for captions and sounds in the DVD player 6 is not completed, when "USER DESIGNATION" is "INVALID" in FIG. 11, or when the user does not designate modes for captions and sounds in operating play of the DVD 20 (S2: NO), designated modes for display characters and guidance sounds in the navigation system 100 are referred to. The designated modes in the navigation system 100 are stored in the database 21*d* in the HDD 21 or non-volatile memory 9. When the designation status in the navigation system is valid (S5: YES), the control circuit 8 reads the designated modes for display characters and guidance sounds (S6). The read designated modes are sent to the DVD player 6 (S4). The DVD 20 is then played based on the designated modes (S8).

There may be a case that no modes for captions and sound are designated in the DVD player 6 (i.e., designation status is invalid), and, furthermore, that designation status of display characters and guidance sounds in the navigation system is invalid (S5: NO). In this case, the default modes in the navigation system 100 are read (S7) and sent to the DVD player 6 (S4). The DVD 20 is then played (S8) based on the designated modes.

Figure 13:
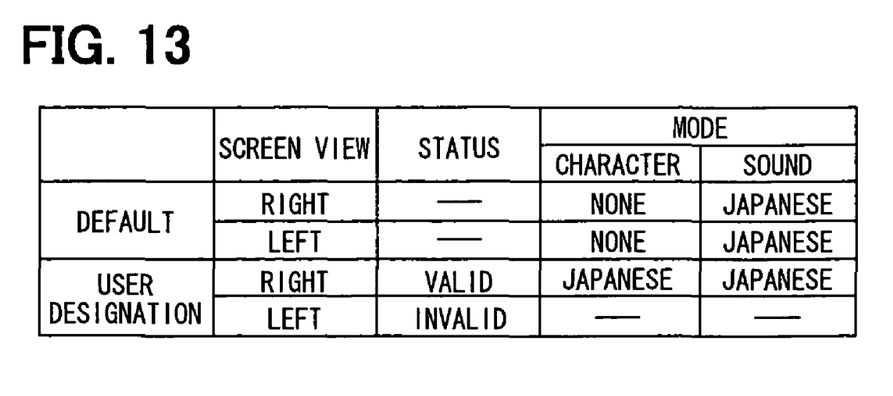
FIG. 13 is a table illustrating designated modes for display characters and guidance sounds in a navigation system.

FIG. 13 shows an example of designated modes for display characters and guidance sounds in the navigation system 100. The initial or designated modes in "DEFAULT" (default modes) are similar to those for captions and sounds used in the DVD player 6 shown in FIG. 11. In FIG. 13, only "RIGHT SCREEN VIEW" from the driver seat includes modes designated by the user.

Examples of specific screen views will be explained with respect to designated modes in FIGS. 11, 13. The user designation is invalid for the right screen view in FIG. 11, so that designated modes for display characters and guidance sounds in the navigation system 100 in FIG. 13 is referred to. The user designation for display characters and guidance sounds is valid for the right screen view in FIG. 13, so that the corresponding designated modes are read and the DVD 20 is played with the Japanese caption and Japanese sound (in Japanese). In contrast, the user designation for captions and sounds is valid for the left screen view from the assistant-driver seat in FIG. 11, so that the corresponding designated modes are read and the DVD 20 is played with the Japanese caption and English sound (in English).

The default modes for captions and sounds in the DVD player 6 can be used when designation status for captions and sounds in the DVD player 6 is invalid (i.e., no modes are designated in the user designation in the DVD player 6, and, furthermore, designation status for display characters and guidance sounds in the navigation system 100 is invalid. Alternatively, the control circuit 8 designates default modes for captions and sound previously stored in a DVD 20 or a video received from an Internet broadcast station.

The structure of the present invention can be applied not only to the video played from the DVD 20, or storage medium, but also to a video received from a TV broadcast station. For instance, a TV tuner is coupled with the navigation system 100 via the external coupling device 26, and a channel and video/sound are designated via the input device. A method for playing the video and sound is the same as that in the known TV receiver.

The structure of the present invention can be applied to not only the video played from the DVD 20, or storage medium, but also to a video received from an Internet broadcast station. For instance, the navigation system 100 can communicate with an Internet broadcast station via the communicator 13 or a communicating unit (not shown) coupled with the external coupling device 26. A method for playing the video and sound from the Internet broadcast station is the same as that in the DVD player 6 because the video from the Internet broadcast station is typically encoded in the MPEG2 or the like. With reference to FIG. 7, the video and sound signals are inputted to the demodulator 54. After undergoing the above signal processing, the signals are then played.

Furthermore, there may be a case that an audio/visual device is coupled with the external coupling device 26. In this case, modes for captions and sounds designated via the input device are transmitted to the audio/visual device, and videos and sounds can be played based on the designated modes. Furthermore, there may be a case that the user designations in both the DVD player 6 and navigation system 100 are invalid. In this case, default modes in the audio/visual device can be used for playing the videos and sounds.

Each or any combination of processes or steps explained in the above can be achieved as a software unit (e.g., subroutine) or a hardware unit (e.g., circuit or integrated circuit), including or not including a function of a related device; furthermore, the hardware unit can be constructed inside of a microcomputer.

It will be obvious to those skilled in the art that various changes may be made in the above-described embodiments of the present invention. However, the scope of the present invention should be determined by the following claims.

What is claimed is:

1. A multi-video display system comprising:
    a multi-video display unit configured to display videos on mutually different screen views in a single screen, the screen views being respectively viewable from mutually different positions; and
    a control circuit including:
        a caption mode designating unit that designates one of caption modes for each of the videos on the screen views,
        the caption mode designating unit further causing the display unit to display a window on each of the screen views,
            the window containing mutually different operation switch buttons being respectively designated with respect to the mutually different screen views for designating the one of the caption modes; and
        a caption adding unit that adds one of captions based on the designated one of the caption modes to the each of the displayed videos.

2. A multi-video display system comprising:

a multi-video display unit configured to display videos on mutually different screen views in a single screen, the screen views being respectively viewable from mutually different positions; and a control circuit including:

a sound mode designating unit that designates one of sound modes for each of the videos displayed on the screen views, the sound mode designating unit that designates one of sound modes for each of the videos displayed on the screen views, the sound mode designating unit further causing the display unit to display a window on each of the screen views, the window containing mutually different operation switch buttons being respectively designated with respect to the mutually different screen views for designating the one of the sound modes; and a sound adding unit that adds one of sounds based on the designated one of the sound modes to the each of the displayed videos.

3. A multi-video display system comprising:

a multi-video display unit configured to display videos on mutually different screen views in a single screen, the screen views being respectively viewable from mutually different positions; and a control circuit including:

a caption mode designating unit that designates one of caption modes for each of the videos displayed on the screen views;

a caption adding unit that adds one of captions based on the designated one of the caption modes to the each of the displayed videos, a sound mode designating unit that designates one of sound modes for the each of the videos displayed on the screen views, and a sound adding unit that adds one of sounds based on the designated one of the sound modes to the each of the displayed videos, the control circuit being further configured to cause the display unit to display a window on each of the screen views, the window containing mutually different operation switch buttons being respectively designated with respect to the mutually different screen views for designating the one of the caption modes or the one of the sound modes.

4. The multi-video display system of claim 1, further comprising:

a designated caption storage unit that stores the designated one of the caption modes, wherein the caption adding unit that adds one of captions based on the stored designated one of the caption modes to the each of the displayed videos.

5. The multi-video display system of claim 2, further comprising:

a designated sound storage unit that stores the designated one of the sound modes, wherein the sound adding unit that adds one of sounds based on the stored designated one of the sound modes to the each of the displayed videos.

6. The multi-video display system of claim 1, further comprising:

a navigating unit that navigates a vehicle to a destination by displaying a current position of the vehicle on an electronic map on the display unit; and a character mode designating unit that designates one of character modes for the navigating, wherein the caption mode designating unit designates, as the one of the caption modes for the each of the displayed videos, the designated one of the character modes for the navigating.

7. The multi-video display system of claim 1, further comprising:

a caption mode obtaining unit that obtains an initial mode of the caption modes for the each of the displayed videos, wherein when the caption mode designating unit does not designate one of the caption modes for the each of the displayed videos, the caption adding unit adds one of the captions based on the obtained initial mode of the caption modes to the each of the displayed videos.

8. The multi-video display system of claim 2, further comprising:

a navigating unit that navigates a vehicle to a destination by displaying a current position of the vehicle on an electronic map on the display unit;

a sound guidance unit that performs the navigating by using a sound; and a guidance sound mode designating unit that designates one of guidance sound modes for the navigating, wherein the sound mode designating unit designates, as the one of the sound modes for the each of the displayed videos, the designated one of the guidance sound modes for the navigating.

9. The multi-video display system of claim 2, further comprising:

a sound mode obtaining unit that obtains an initial mode of the sound modes for the each of the displayed videos, wherein when the sound mode designating unit does not designate one of the sound modes for the each of the displayed videos, the sound adding unit adds one of the sounds based on the obtained initial mode of the sound modes to the each of the displayed videos.

10. The multi-video display system of claim 1, wherein the videos correspond to an identical video that is played from a storage medium.

11. The multi-video display system of claim 1, wherein the videos correspond to an identical video that is received from a TV broadcast station.

12. The multi-video display system of claim 1, wherein the videos correspond to an identical video that is received from an Internet broadcast station.

13. The multi-video display system of claim 2, wherein the videos correspond to an identical video that is played from a storage medium.

14. The multi-video display system of claim 2, wherein the videos correspond to an identical video that is received from a TV broadcast station.

15. The multi-video display system of claim 2, wherein the videos correspond to an identical video that is received from an Internet broadcast station.

* * * * *